Dec. 20, 1955

C. A. BONVILLIAN ET AL 2,727,566

APPARATUS FOR THE COMBUSTION OF FUEL

Original Filed March 13, 1943

Inventors
CLAUDE A. BONVILLIAN
RALPH C. BRIERLY
SAMUEL LETVIN

By

Attorney

United States Patent Office 2,727,566
Patented Dec. 20, 1955

2,727,566

APPARATUS FOR THE COMBUSTION OF FUEL

Claude A. Bonvillian, Chattanooga, Tenn., Ralph C. Brierly, Narberth, Pa., and Samuel Letvin, Elmhurst, N. Y.

Original application March 13, 1943, Serial No. 479,010. Divided and this application December 1, 1949, Serial No. 130,570

3 Claims. (Cl. 158—4)

(Granted under Title 35, U. S. Code (1952), sec. 266)

This invention relates to the combustion of fuels, and more particularly pertains to apparatus for the combustion of fuels preferably at relatively high heat releases.

The invention provides a combustion chamber of heat resistant metal or equivalent material which comprises a plurality of metallic bands constructed and arranged to provide for the passage of secondary air or of other fluids between them into the chamber. The metallic bands serve to shape the flame produced in the combustion chamber in the desired manner, to promote the attainment of the maximum heat release, the maximum combustion speed, and the maximum homogeneity of gases leaving the furnace, not only in regard to temperature but also with respect to constituents. This arrangement is particularly advantageous where lightness of weight is required, and it avoids the erosion that may occur with firebrick or refractory linings with high velocities of air or gas, and which ordinarily results in the entrainment of particles which may have an abrasive action on turbine blading or cause deleterious results in portions of the system beyond the combustion chamber.

The nature of the invention will be understood from the following description when considered in connection with the accompanying drawing forming a part thereof, and in which.

Like characters of reference refer to the same parts throughout the several views.

This application is a division of our copending application Serial No. 479,010 filed March 13, 1943, now Patent No. 2,500,925 dated March 21, 1950.

Figure 1:
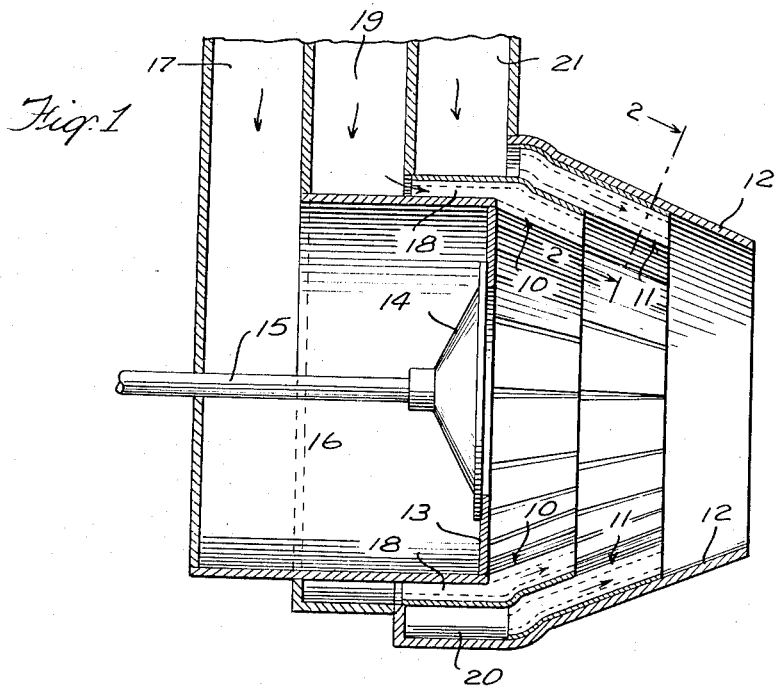
Fig. 1 is a longitudinal sectional view of one form of combustion chamber embodying the invention.

Referring to the drawing, in the form of combustion chamber selected for illustration, the furnace is arranged so that air, or any other substance to be introduced into direct contact with the gases in the chamber, is delivered separately to the space between each adjacent pair of furnace bands. As shown, the furnace comprises three bands 10, 11 and 12 which are arranged telescopically. The outer band 12 in this instance constitutes the casing or shell of the furnace. Band 10 is at the burner end of the furnace and adjoins an end plate 13 which carries a burner 14 to which fuel is supplied through a fuel connection 15. Suitable enclosing members provide an air chamber 16 to which air is supplied through an inlet connection 17. The space between the bands 10 and 11 is in communication with a chamber 18 which surrounds part of the air chamber 16 and to which air or other substance is supplied through an inlet connection 19. Similarly, the space between the bands 11 and 12 communicates with a chamber 20 which surrounds part of the chamber 18, and air or other substance is supplied to the chamber 20 through an inlet connection 21. The inlet connections 17, 19 and 21 may communicate with the same source of air or other substance, or they may communicate with separate sources, or two or more may connect with the same source, while others connect with another source or other sources. With this arrangement the exterior of the furnace can be kept relatively cool without the necessity of using special coolants or insulation. This arrangement is particularly well adapted to the recycling of gases produced in the furnace. It will be understood that if the furnace gases alone, or mixed with other chemical substances, were returned directly to the burner end of the furnace, they might tend to extinguish the flame in the furnace because of their high $CO_2$ content, or they might be of such temperature that the entire furnace structure would be jeopardized through too high a preheat or through other chemical or physical effects incompatible with best operation. With the arrangement shown in Fig. 1, the gases may be recycled, either with or without intermixed coolants or chemical substances, to bands or sections down stream from the burner, while simultaneously obtaining the advantage of the heating or cooling effect of the recycling through the external jackets or chambers of the furnace. In lieu of the telescopic arrangement of the external chambers 18 and 20, they may be arranged concentrically or side by side, or they may be manifolded together. Obviously, any desired number of bands may be employed in the arrangement shown in Fig. 1.

Figure 2:
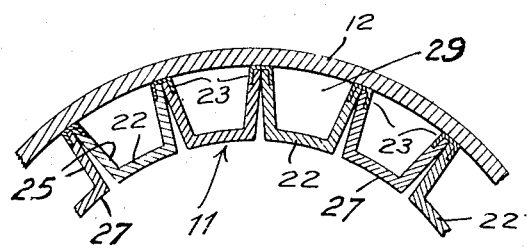
Fig. 2 is a sectional view on line 2—2 of Fig. 1 showing the construction of a furnace band and the relative positions of the component parts thereof in unheated condition.
Figure 3:
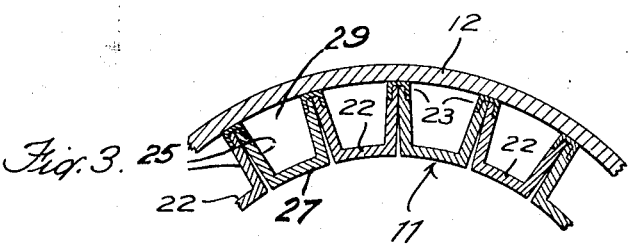
Fig. 3 is a similar view showing the relative positions of the parts of the band in heated condition.

In order to prevent warping of the furnace bands, or the casing, or both, special constructions may be employed to transfer heat therefrom, one of which is shown in the drawing. The bands 10 and 11 are formed of a plurality of U-shaped sections 22 with the outer end portions of the adjacent legs 25 of adjacent sections secured together by clips 23 fitted, bolted or welded thereto, and which are in contact with the adjacent and outer band or casing, or both, 12. Any desired number of bands may be so constructed. Before the combustion chamber is fired, the U-shaped sections 22 are in the relative positions shown in Fig. 2 wherein they are spaced apart excepting for the outer end portions of adjacent legs of adjacent sections. The clearance between adjacent sections is sufficiently great so that under no condition of temperature of the sections will they come tightly in contact with each other. When the chamber is fired, the bases or webs 27 of the sections 22 are heated and expand and diminish the clearance between the sections until they assume the positions shown in Fig. 3.

With this arrangement of furnace bands, the heat absorbed from the furnace by the bands will be conducted to the legs of the U-shaped sections 22 and will be dissipated by conduction and radiation to the secondary air or other fluid introduced into the furnace between the bands and passing through the openings 29 through the channel sections. Little or no temperature effect is experienced with the use of the clips 23 to secure the U-shaped sections 22 of the bands together, because the sections in the zones of the clips are remote from the high temperature and are kept at low temperature by the secondary air or other fluid flowing through the U-shaped sections.

The invention disclosed herein may be manufactured and used by or for the Government of the United States for Government purposes without the payment of any royalty thereon.

It will be understood that changes may be made in the form, location and relative arrangement of the several parts of the apparatus disclosed without departing from the principles of the invention. Accordingly, the invention is not to be limited excepting by the scope of the appended claims.

What is claimed is:

1. A combustion apparatus comprising a plurality of axially aligned frusto-conical shells, said shells being disposed with their walls converging in the same direction defining a combustion chamber having end and intermediate shells and being spaced apart to provide a plurality of annular passageways in communication with the combustion chamber, an inlet adjacent the large diameter end of one shell for the admission of a combustible fluid mixture to the combustion chamber and an outlet at the small diameter end of the other end conical shell for removal of combustion products, each of said shells having a plurality of channel shaped sections extending longitudinally of each passageway, manifolding means adjacent the large diameter end of each passageway for independently supplying fluid to each passageway for admission to the combustion chamber, each of said sections having leg portions and interconnecting web portions, said leg portions of each section extending from the web portion and being positioned to provide a seal with the inner face of a conical shell, and the adjacent web portions and adjacent leg portions being spaced to permit expansion between adjacent channel sections, means securing adjacent channel sections together providing a composite ring of independent fluid compartments for each shell.

2. A combustion apparatus comprising a plurality of axially aligned frusto-conical shells, said shells being disposed with their walls converging in the same direction defining a combustion chamber having end and intermediate shells and being spaced to provide a plurality of annular passageways in communication with the combustion chamber, an inlet adjacent the large diameter of one end shell for the admission of a combustible fluid mixture to the combustion chamber and an outlet at the small diameter end of the other end shell for removal of combustion products, a plurality of channel shaped sections extending longitudinally of each passageway, manifolding means adjacent the large diameter end of each passageway for supplying an independent fluid to each passageway for admission to the combustion chamber, each of said sections having leg portions and interconnecting web portions, said leg portions of each section diverging from the web portion and being positioned adjacent the inner face of a conical shell and said web portions being disposed in circumferentially spaced relation providing expansion spaces between adjacent channel sections, means securing adjacent channel sections together providing a composite ring of independent fluid compartments for each shell.

3. Combustion apparatus as defined in claim 1 further characterized by resilient means securing the adjacent leg portions of the channel sections together to provide a composite and expansible ring of fluid compartments.

References Cited in the file of this patent

UNITED STATES PATENTS

| | | |
|---|---|---|
| 234,395 | Dickey | Nov. 16, 1880 |
| 1,027,961 | Wurst | May 28, 1912 |
| 1,387,359 | Davis | Aug. 9, 1921 |
| 1,697,048 | Cox | Jan. 1, 1929 |
| 2,161,417 | Holmes | June 6, 1939 |
| 2,195,025 | Couzinet | Mar. 26, 1940 |
| 2,268,464 | Seippel | Dec. 30, 1941 |
| 2,334,314 | Campbell | Nov. 16, 1943 |
| 2,363,168 | Findley | Nov. 21, 1944 |
| 2,401,032 | Williams | May 28, 1946 |
| 2,446,059 | Peterson et al. | July 27, 1948 |
| 2,448,561 | Way | Sept. 7, 1948 |
| 2,500,925 | Bonvillian et al. | Mar. 21, 1950 |
| 2,603,064 | Williams | July 15, 1952 |
| 2,617,255 | Niehus | Nov. 11, 1952 |

FOREIGN PATENTS

| | | |
|---|---|---|
| 539,069 | Great Britain | Aug. 27, 1941 |